United States Patent Office 3,449,780
Patented June 17, 1969

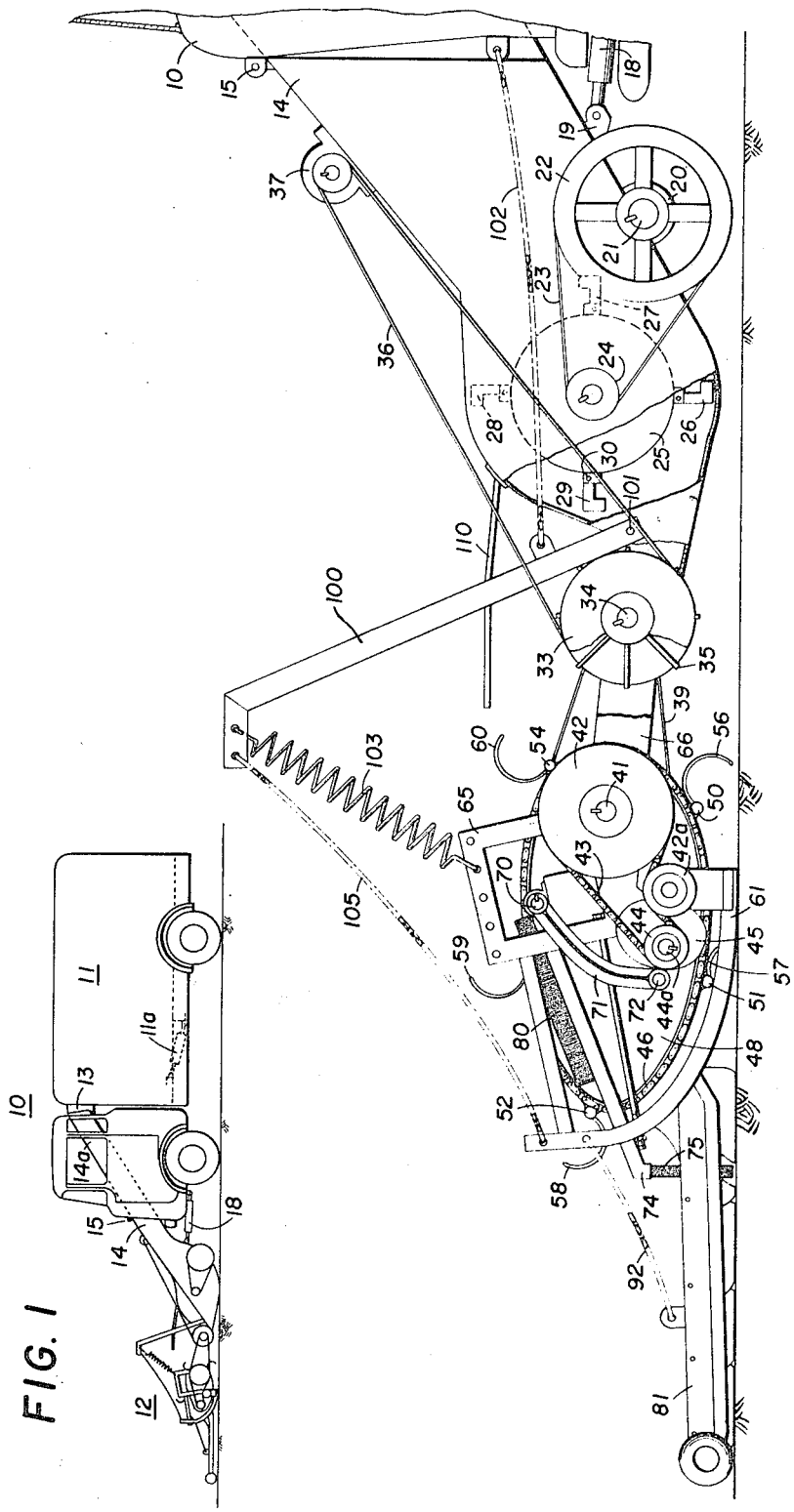

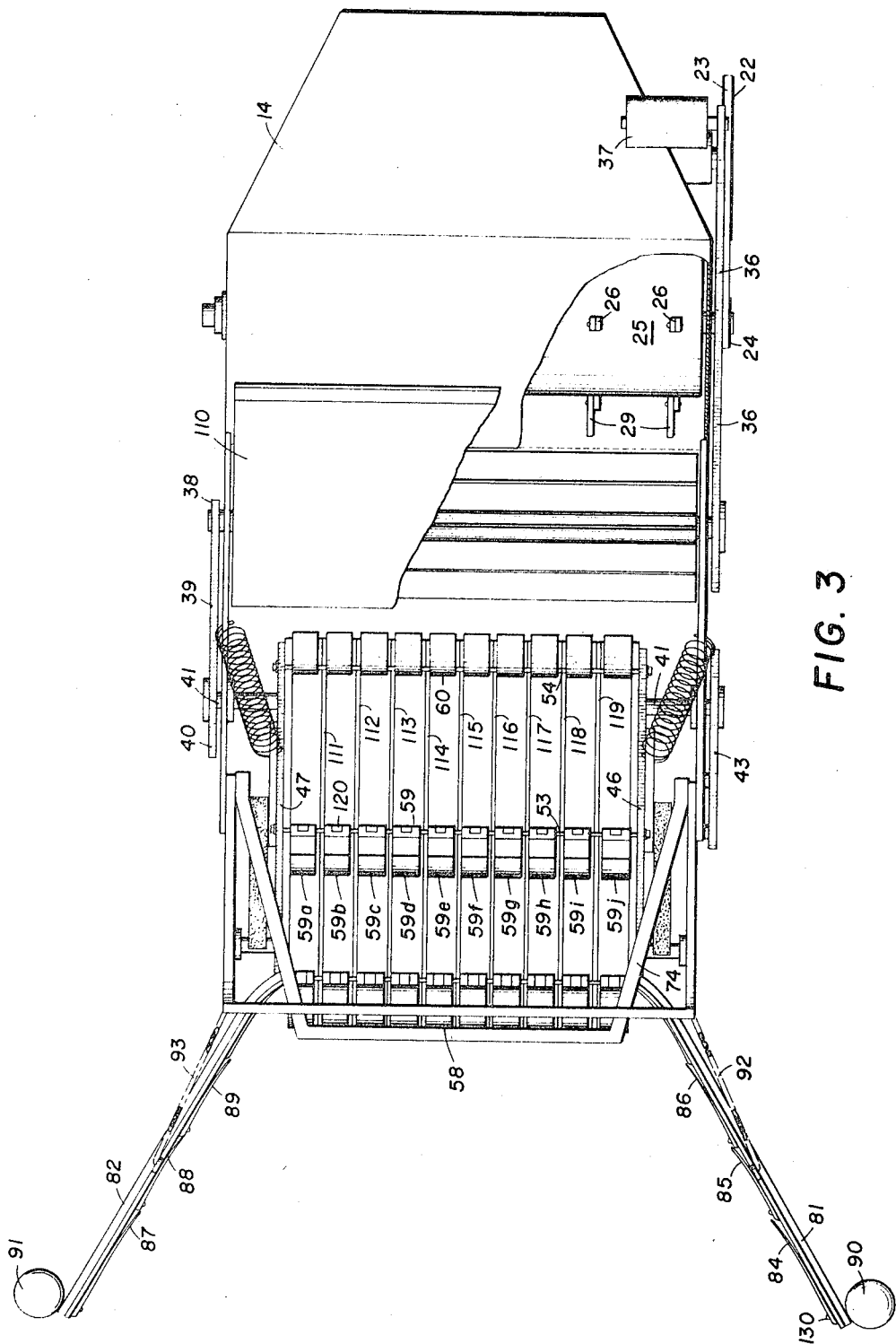

3,449,780
LITTER COLLECTOR-PULVERIZER
Alvin R. Juno, Plainview, Tex., assignor, by mesne assignments, to First National Bank in Quanah, Tex.
Filed Mar. 24, 1966, Ser. No. 537,040
Int. Cl. A47l 11/00; A46b 13/04; E01h 1/04
U.S. Cl. 15—4                                14 Claims

ABSTRACT OF THE DISCLOSURE

An apparatus for collecting litter scattered over a course by traversing the course with three elements connected in tandem. A lead element collects the litter during movement along a traverse by picking up the litter with upwardly moving tines and by transferring the litter to an intermediate element which delivers the litter to the trailing element. The trailing element includes a flail drum which has hammer elements pivotally mounted thereon in order to fragmentize the litter by impact and also to drive the litter into a storage location in response to the impact.

---

This invention relates to a system for automatically collecting and loading debris often found on a right-of-way adjacent to public thoroughfares. In a more specific aspect, the invention relates to a synchronized gathering and delivery system which will load such debris into a storage compartment on a vehicle.

A wide variety of articles are carelessly or maliciously left on public thoroughfares. As a result, a constantly increasing cost for maintaining such thoroughfares in a sightly condition has been experienced. Highway maintenance operations dealing solely with the litter problem are of such magnitude as to require mechanized operations. Various rock-picking devices and litter-handling systems have been proposed. In order to handle the materials generally encountered, it has been found desirable to mechanically work the materials after collection thereof to reduce the size so that a given unit can operate longer without having to discontinue operations for unloading purposes.

Thus in accordance with the present invention, a system is provided in which a plurality of ranks of tines move forward relative to a carrier over a terrain passing beneath the carrier. The invention involves supporting the tines in ranks transversely to span the traverse. In one aspect, a brush spanning the traverse is reciprocated vertically along the forward point of the traverse of each rank of tines and in synchronism with movement thereof for downward movemet ahead of the ranks of tines as each rank begins its upward motion from beneath the carrier.

In a further aspect of the invention, debris received from the tines as they travel over the top of the array is worked and propelled into a carrier storage unit. Preferably the latter provision involves the used of a high speed flail drum.

For a more complete understanding of the present invention and for further objects and advantages thereof, reference may now be had to the following description taken in conjunction with the accompanying drawings in which:

FIGURE 1 is a side view of a unit embodying the present invention;

FIGURE 2 is a side view of the unit of FIGURE 1; and

FIGURE 3 illustrates one arrangement for mounting and propelling the unit of FIGURE 1 and FIGURE 2.

Referring now to FIGURE 1, a system is illustrated in which a truck 10, having a storage compartment 11, is provided with a collector unit 12. The storage compartment 11 has an inlet duct 13 near the upper edge of the front face thereof. The storage compartment 11 is actuated by a hydraulic unit 11a to facilitate unloading by pivoting the storage compartment 11 about an axis near the rear axle of the truck. The collector 12 is adapted to pick up and deliver debris to a chute 14 which directs the debris upwardly at an angle through the cab of the truck 10 and which joins with the inlet 13.

Litter accumulated, as along the edge of a roadway, is directed and deposited in the compartment in such condition that large quantities collected from a substantial area can be handled before the compartment must be unloaded. When filled, the collector 12 is retracted or elevated so that the truck may be driven to a dump where the storage compartment is unloaded.

The present invention is primarily directed to features of the system including the collector 12 and the debris-working elements, and the cooperation therebetween.

As best shown in FIGURE 2, the chute 14 extends upwardly at an angle and is mounted from the frame of the vehicle 10 at the front thereof. The chute is pivotally mounted relative to the portion 14a for rotation on a horizontal axis 15 located at the upper margin of the chute 14. The chute 14 is coupled to the frame of the vehicle 10 by a hydraulic cylinder 19 which is coupled to a linkage 19 at the bottom of the chute 14. A hydraulic motor 20 mounted on a shaft 21 serves to drive a pulley 22. The pulley 22 is linked by belt 23 to a pulley 24 which drives a flail drum 25. The drum 25 is positioned in the lower end of the housing leading to the chute 14 and includes four sets of flails 26–29, each of which is mounted on pivots such as the pivot 30 on the surface of the drum 25.

The motor 20 is powered from hydraulic lines (not shown) leading from a suitable supply system in the vehicle 10. The flail drum serves as a hammer mill to pulversize any debris placed therein and to project the same upward along the chute 14 into the storage compartment. The drum 25 rotates in a counterclockwise direction.

Adjacent to the mouth of the compartment 32 in which the drum 25 is mounted, is a paddle wheel 33. The paddle wheel 33 is mounted for rotation on shaft 34 and includes a plurality of rubber blades 35. The paddle wheel 33 rotates in a clockwise direction and is powered by way of a belt 36 leading from a hydraulic motor 37. A small pulley 38 (FIGURE 3) on shaft 34 is coupled by belt 39 to a large pulley 40 which is mounted on a shaft 41. A sprocket wheel 42 mounted on shaft 41 is coupled by way of a chain 43 to a sprocket wheel 44 mounted on shaft 44a. The chain 43 also passes over an idler 42a. The shaft 44a is keyed to a cam 45.

A pair of sprocket chains 46 and 47 are driven by sprockets mounted on shaft 41. The chains 46 and 47 travel over a guide such as guide 48, FIGURE 2, as to follow an oval path.

In this embodiment, at least five transverse bars 50–54 serve to interconnect chains 46 and 47. Bars 50–54 are located at five equally spaced points along the length of the chains 46 and 47. The bars 50–54 each support a plurality of sets of tines 56–60, respectively. A plurality of tines are in each set and are pivoted on the respective bars. Each tine is resiliently biased toward the position represented by the tine 60, FIGURE 2. A runner 61 normally slides along the ground. During passage of the chains 46 and 47 in the forward tranverse, the times may yield and bend backwards, as in the position represented by tine 57. As the tines move forward, they carry debris in the forward direction. As the tines become free of the earth's surface, they then move forward and upward carrying debris therein. The debris is carried up over the top course of the chain travel and is then dumped into the compartments between the paddles on the paddle wheel 33. The paddle wheel 33 delivers the debris into the compartment occupied by the hammer mill or flail drum 25. The material is then worked and fragmented by impact of the hammers 26–29 and at the time is propelled by impact upwardly through the chute.

The shaft 41 and the elements of the system located forward of the shaft 41 are mounted on a frame 65 which includes an arm 66 which is pivoted on the shaft 34. Thus, the portion of the system supported by runner 61 may be rotated on shaft 34 to be elevated above the earth and free from contact with the earth. Further, the hydraulic cylinder 18 can be actuated to control the elevation of the flail drum 25.

A shaft 70 is mounted in a suitable bearing on the frame 65 and supports a cam follower arm 71 having a cam follower 72 at the end thereof. The cam follower 72 follows the cam 45 as it rotates. The shaft 70 also is keyed to an arm 74 which supports a vertically extending brush at the extremity thereof. The brush is caused to oscillate up and down in synchronism with the cam 45. The cam 45 rotates five times for each complete rotation of the chains 46 and 47. Thus, the movement of the brush 75 is synchronized with the upward travel of each of the sets of tines 56–60. The movement of the brush 75 is so timed that is descends as each set of tines experiences upward movement. The tip of the tines slides along the rear surface of the bristles of the brush 75. The brush 75 thus serves to prevent debris from falling out of the tines as they travel upward. As the tines are in their forward movement, compound movement is produced by the chains 46 and 47 and the springs coupled thereto. The brush serves as a batter board for material that would be thrown forward by the tines as they are moved under spring tension. As a result, the material collected in the tines will be cupped in the trough formed by the tines and will be carried to the paddle wheel.

A pair of brushes 80 are mounted along the side of the upper traverse of the chains 46 and 47 so that the debris will not spill off from the sides.

A pair of bars 81 and 82 are pivoted from the frame 65 and extend forwardly and outwardly from each side of the unit to collect material into the zone swept by the tines. As best seen in FIGURE 3, bars 81 and 82 each carry a plurality of blades pivoted at their forward end and serving to wipe along a surface on the trailing ends. More particularly, bar 81 has three pivoted blades 84–86. Bar 82 has three pivoted blades 87–89. A ball-shaped roller 90 is positioned on the end of the bar 81, and a similar roller 91 is mounted on the end of the bar 82. Chains 92 and 93 serve to control the angle at which the bars 81 and 82 extend from the system.

The scraper blades 84–89 are pivotally mounted at their forward ends on arms 81 and 82. More particularly, a pivot pin 130 serves to mount the scraper blade 84 so that the trailing edge may rest on the surface over which the arm 81 passes. The remaining blades are similarly mounted. Thus, the blades serve to scrape the surface and move debris inward to the zone traversed by the tines.

A bar 100 is pivoted on pin 101 at its lower end and is thus supported by the flail drum housing 32. The bar 100 is maintained in a predetermined attitude by a chain 102. The upper end of the bar 100 is coupled by way of a spring 103 to the frame 65. The spring serves to control the drag between the runner 61 and the earth's surface. A chain 105 serves to limit the extent to which the frame 65 may rotate on shaft 41.

A forwardly extending canopy 110 is mounted on the front face of the housing for the flail drum 25 and extends over the paddle wheel.

The sets of tines, as shown in FIGURE 3, are mounted in a spaced-apart relation. For example, tines 59a–59j are mounted on the bar 53. The tines are mounted to rotate on the bar 53 and are spaced apart by spacer ribs 111–119. Each tine is mated with a stop. For example, the stop 120, on the bar 53, cooperates with tine 59b to limit the rotational movement of tine 59b in a clockwise direction. A spring (not shown) mounted on the bar 53 urges the tine 59b against the stop 120. The spring and stop arrangement on the bar 53 permit limited rotation of the tines in a counterclockwise direction when necessary to clear the terrain over which the set of tines is drawn.

It will be recognized that the foregoing description is illustrative of one embodiment of the invention and that modifications may be made therein. However, by way of example, in the embodiment of the invention disclosed in the drawings, the flail drum 25 was driven at a speed of about 1500 r.pm. The paddle wheel 33 was driven at a speed of about 150 r.p.m. The shafts 50–54 were driven at a speed of about 25 cycles per minute. The cam 45 rotated in synchronism with the shafts 50–54 to oscillate the brush 75 at a frequency of 125 cycles per minute. It will be appreciated that the foregoing may be varied and that power may be applied to the various rotating elements in a manner different from that shown herein, and that other variations may be made therein without departing from the spirit or scope of the appended claims.

Having described the invention in connection with certain specific embodiments thereof, it is to be understood that further modifications may now suggest themselves to those skilled in the art and it is intended to cover such modifications as fall within the scope of the appended claims.

What is claimed is:

1. In a system having a plurality of ranks of tines which move forward in a closed loop traverse relative to a carrier over terrain passing beneath said carrier as it moves along a course, the combination which comprises:
    (a) means for supporting said ranks of tines to span said course, and
    (b) brush means spanning said course reciprocated vertically at the forward point of said ranks in said traverse and synchronized for vertical movement downward immediately ahead of the tips of the tines in each rank as each rank moves upward from beneath said carrier.

2. The combination set forth in claim 1 in which impact means are provided for receiving debris carried over the top of said loop as it leaves said tines for propelling said debris into a carrier.

3. The combination set forth in claim 2 in which said impact means includes a high speed flail drum.

4. The combination set forth in claim 1 in which said ranks are of equal spacing around said closed loop traverse and in which said ranks and said brush are driven from a common powered drive.

5. The combination set forth in claim 1 in which said tines are mounted on a lead element of a tandem three element array with the trailing element being a high speed flail drum rotating in direction opposite the rotation of said tines to work and propel debris into said carrier and in which the intermediate element in said array is a paddle wheel rotating in the same direction as said tines for receiving debris from said tines and delivering the same to said flail drum.

6. The combination set forth in claim 5 in which the speed of rotation of said tines, paddel wheel and drum are of the order of 25, 150 and 1500 revolutions per minute.

7. The combination set forth in claim 5 in which said paddle wheel has a plurality of continuous radial resilient blades and said flail has a plurality of spaced radial sets of hammers pivotally mounted at the periphery of a drum.

8. In a litter collector, the combination of:
    a vehicle having a storage compartment for receiving and storing litter.

a flail drum housing carried by the vehicle and separated from the storage compartment, said housing having an opening for receiving litter, an elongated chute extending from the flail drum housing to the storage compartment for guiding litter propelled from the flail drum housing to the storage compartment, a high speed flail drum rotatably disposed in the flail drum housing to fragment the litter and impel the litter from the housing through the delivery chute to the storage compartment as a result of impact, and means for collecting litter from the ground and introducing the litter to the flail drum housing through the opening as the vehicle moves along a traverse over the ground.

9. The combination defined in claim 8 wherein the flail drum is a hammer mill having a plurality of hammer elements for impacting and fragmenting the litter which are pivotally connected to a rotating drum.

10. The combination defined in claim 8 wherein:
the flail drum housing is located near the ground at the front of the vehicle and the storage compartment is located above and to the rear of the flail drum housing.

11. The combination defined in claim 10 wherein the storage compartment is an enclosed dump bed.

12. The combination defined in claim 8 wherein:
the means for collecting litter from the ground and introducing it to the flail drum housing comprises:
a first means having ranks of tines spanning the course to be cleaned which move forwardly and upwardly to pick litter from the ground, and
means for transferring litter from the tines through the opening into the flail drum housing.

13. The combination defined in claim 12 wherein:
the means for transferring the litter from the tines to the flail drum housing comprises:
a paddle wheel rotating in the same direction as said tines.

14. The combination defined in claim 8 wherein the means for collecting litter from the ground and introducing the litter to the flail drum housing includes:
means having ranks of tines spanning the course to be cleaned which move forwardly and upwardly to pick litter from the ground, and
brush means spanning said course reciprocated vertically at the forward point of said ranks in said traverse and synchronized for vertical movement downward immediately ahead of the tips of the tines in each rank as each rank moves upwardly.

References Cited

UNITED STATES PATENTS

| 526,794 | 10/1894 | Siccardi | 15—84 |
| 909,576 | 1/1909 | Frost | 241—101 |
| 2,092,102 | 9/1937 | Wilson | 241—101 |

WALTER A. SCHEEL, *Primary Examiner.*

LEON G. MACHLIN, *Assistant Examiner.*

U.S. Cl. X.R.

15—80; 241—99, 101